United States Patent

Cao et al.

[11] Patent Number: 5,954,777
[45] Date of Patent: *Sep. 21, 1999

[54] ADAPTIVE TRANSMISSION CONTROL

[75] Inventors: Chi-Thuan Cao, Korntal-Münchingen; Klemens Kronenberg, Oberriexingen; Marko Poljansek, Reutlingen, all of Germany

[73] Assignee: Robert Bosch GmbH, Stuttgart, Germany

[*] Notice: This patent is subject to a terminal disclaimer.

[21] Appl. No.: 09/136,372

[22] Filed: Aug. 19, 1998

Related U.S. Application Data

[63] Continuation of application No. 08/677,031, Jul. 8, 1996, abandoned.

[30] Foreign Application Priority Data

Jul. 8, 1995 [DE] Germany ............................ 195 24 938

[51] Int. Cl.$^6$ ......................................... G06G 7/70
[52] U.S. Cl. ............................. 701/51; 701/57; 701/65; 477/97; 477/43
[58] Field of Search .................... 701/51, 57, 58, 701/65, 56; 477/43, 46, 97, 143, 148, 155; 474/28; 475/125

[56] References Cited

U.S. PATENT DOCUMENTS

| | | | |
|---|---|---|---|
| 4,663,991 | 5/1987 | Nakamura et al. ...................... | 477/49 |
| 4,680,990 | 7/1987 | Ohgami .................................... | 477/49 |
| 5,025,684 | 6/1991 | Stehle et al. ............................ | 74/162 |
| 5,129,288 | 7/1992 | Sasaki et al. .......................... | 477/120 |
| 5,157,609 | 10/1992 | Stehle et al. ........................... | 701/56 |
| 5,191,814 | 3/1993 | Ando et al. ............................. | 477/125 |
| 5,235,875 | 8/1993 | Yoshida et al. ......................... | 701/57 |
| 5,390,117 | 2/1995 | Graf et al. ............................... | 701/57 |
| 5,400,678 | 3/1995 | Jain et al. ............................... | 477/115 |
| 5,411,449 | 5/1995 | Takahashi et al. ..................... | 477/120 |
| 5,462,501 | 10/1995 | Bullmer et al. ........................ | 477/155 |
| 5,474,508 | 12/1995 | Kondo et al. ........................... | 477/143 |
| 5,571,060 | 11/1996 | Becker et al. .......................... | 477/159 |
| 5,716,301 | 2/1998 | Wild et al. .............................. | 477/97 |

FOREIGN PATENT DOCUMENTS 0161824  11/1985  European Pat. Off. .

OTHER PUBLICATIONS

"ATZ", Automobiltechnische Zeitschrift 92 (1992) 9, pp. 428 to 436.

"ATZ", Automobiltechnische Zeitschrift 95 (1993) 9, pp. 420 to 434.

*Primary Examiner*—Jacques H. Louis-Jacques
*Attorney, Agent, or Firm*—Walter Ottesen

[57] ABSTRACT

The invention is directed to a system for determining the gear ratio changes in an automatic transmission in a vehicle having an accelerator pedal actuated by a driver of the vehicle. The system includes a first sensor for detecting the position (DK) of said accelerator pedal as a first variable and a second sensor for detecting at least one of the following as a second variable: the vehicle straight-line speed ($V_x$), transmission output rpm and the motor rpm. An adaptation variable (BZ) is determined in an evaluation mode in dependence upon a comparison of a time-dependent change of the first variable to at least one threshold value (SW, SW1, SW2). A characteristic field receives the first and second variables as input variables. The characteristic field and the adaptation variable (BZ) are used to form a gear ratio change (SG) for the automatic transmission.

10 Claims, 6 Drawing Sheets

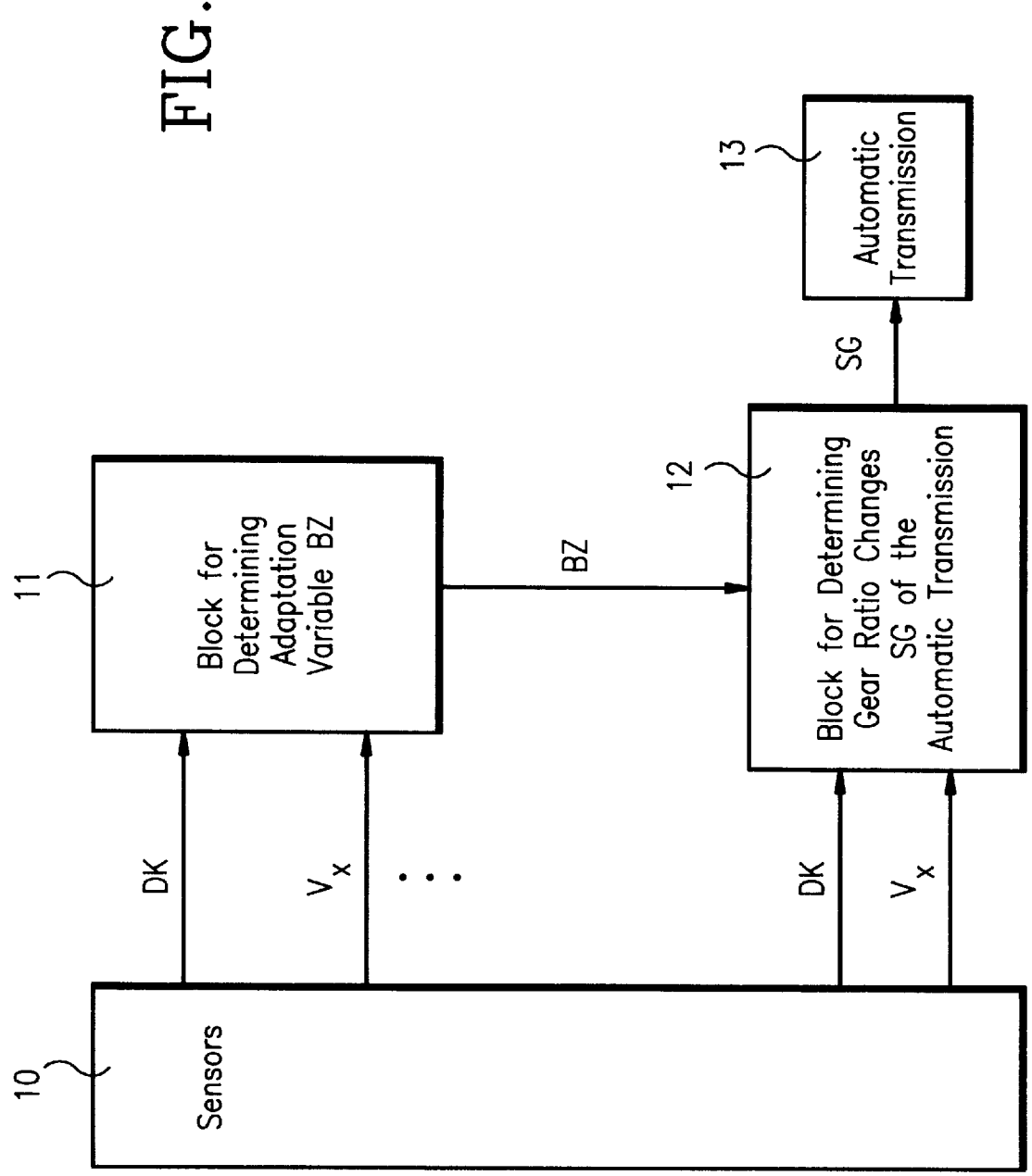

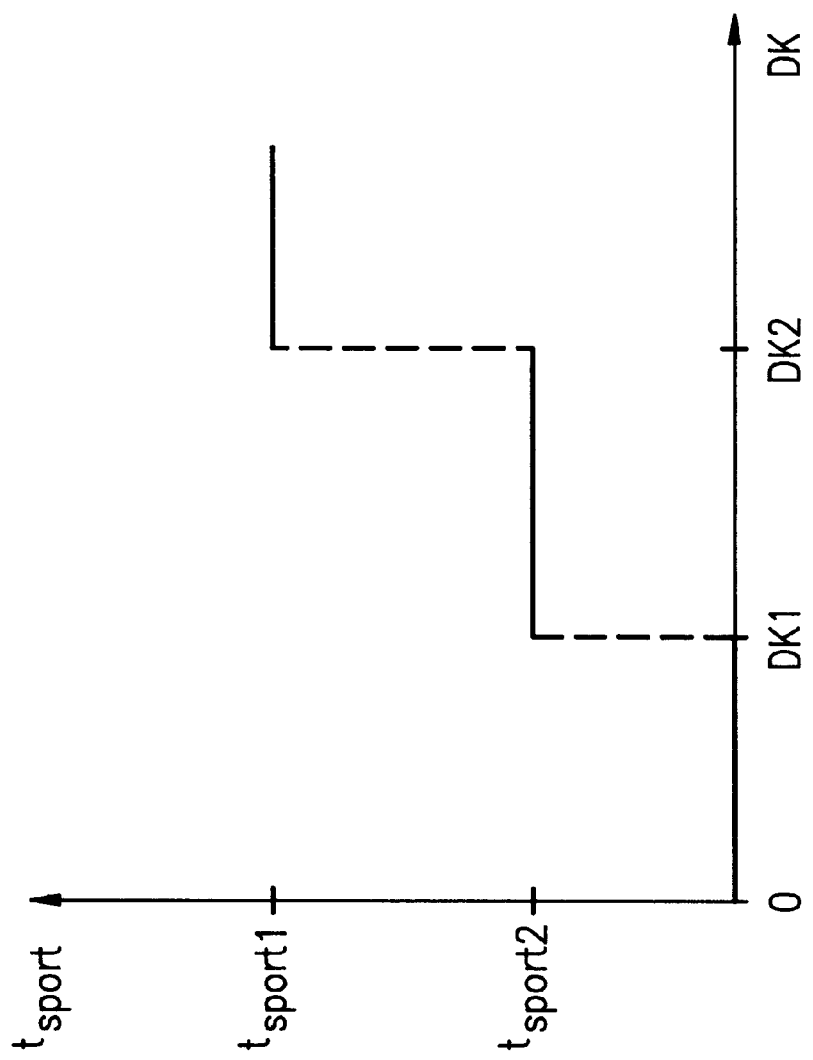

FIG. 3
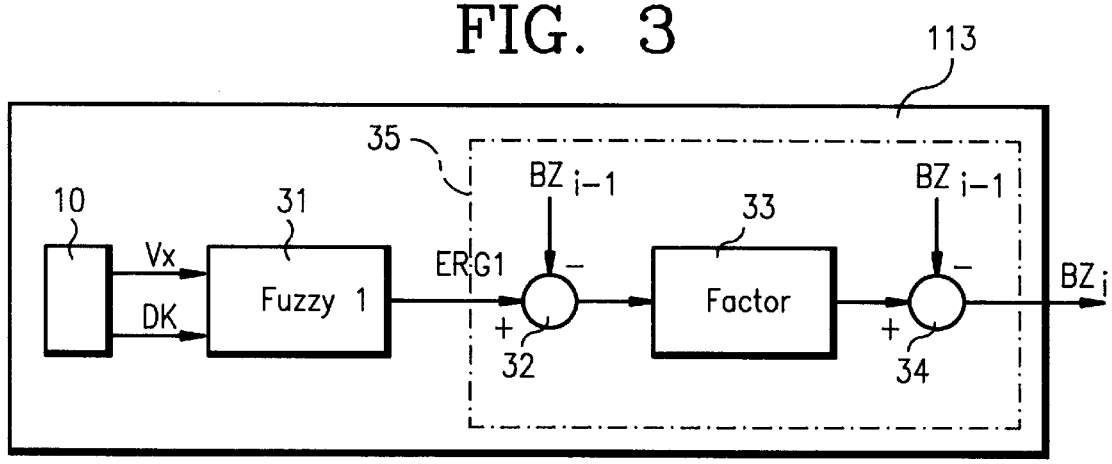
FIG. 4
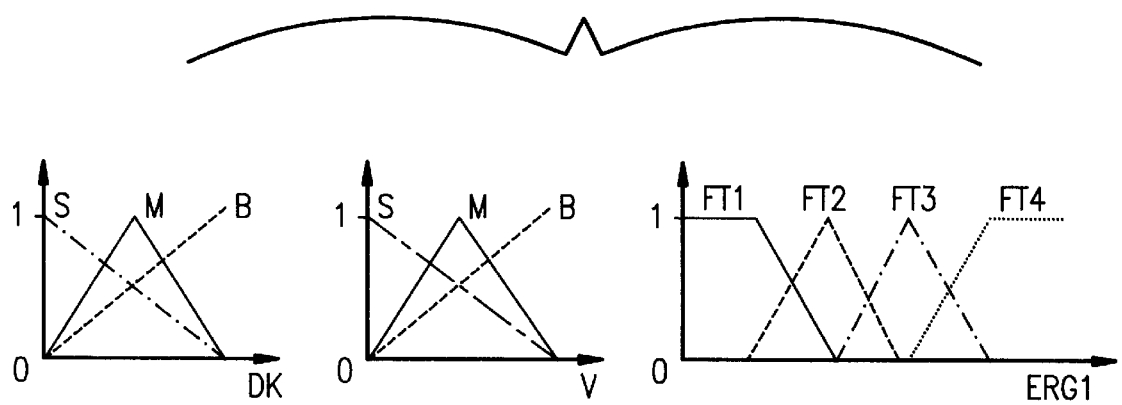
FIG. 5
| DK\V | S | M | B |
|---|---|---|---|
| B | FT2 | FT3 | FT4 |
| M | FT2 | FT2 | FT3 |
| S | FT1 | FT2 | FT2 |

FIG. 6
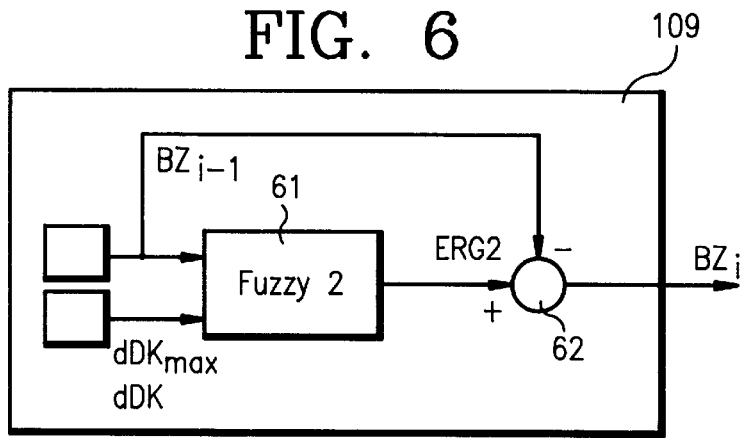
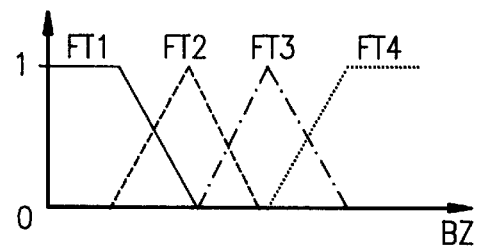
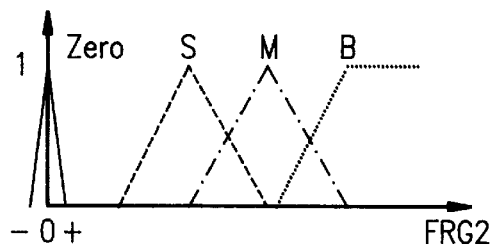
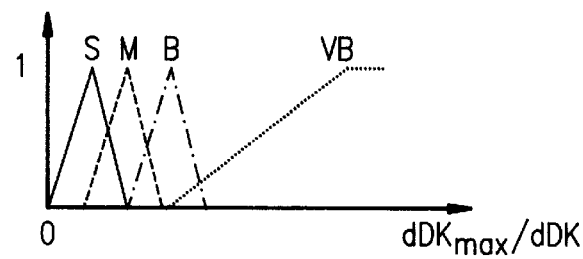
FIG. 7
FIG. 8

ADAPTIVE TRANSMISSION CONTROL

This is a continuation of application Ser. No. 08/677,031, filed on Jul. 8, 1996 now abandoned.

FIELD OF THE INVENTION

The invention relates to a system for determining the gear ratio changes for an automatic transmission.

BACKGROUND OF THE INVENTION

Adaptive transmission controls of the kind referred to above are disclosed, for example, in U.S. Pat. Nos. 5,157,609 and 5,025,684; an article of A. Welter et al entitled "Die Adaptive Getriebesteuerung für die Automatikgetriebe der BMW Fahrzeuge mit Zwölfzylindermotor", published in ATZ, no. 94 (1992) 9, starting at page 428; and, the article of A. Welter et al entitled "Die Adaptive Getriebesteuerung fur BMW-Automobile", published in ATZ, no. 95 (1993) 9, starting at page 420. In automatic transmissions, the gear ratio changes are in general determined in dependence upon the vehicle straight-line speed and from the engine load (throttle flap angle). This takes place with a characteristic field. For adaptive transmission control systems, the characteristic field determines the gear ratio changes and is adapted to the following: the behavior of the driver, the traffic situation and/or the driving situation to which the vehicle is subjected. When classifying the behavior of the driver, an evaluation is generally made as to whether the driver is inclined more to motor power-orientated manner of driving or more to a consumption-optimized manner of driving. When evaluating the traffic situation or driving situation, a determination can be made as to whether the vehicle is: in city traffic, before or in a curve, on a hill or in overrun operation. The particular suitable characteristic line is selected from a number of different characteristic lines in dependence upon the evaluation of the above-mentioned points. Furthermore, a displacement of the basic shifting characteristic field can be provided.

An overall evaluation of driver performance or of the traffic situation or driving situation, in general, requires complex computing procedures.

SUMMARY OF THE INVENTION

It is an object of the invention to provide the most encompassing adaptation of the gear ratio changes for an automatic transmission with the least possible complexity.

The invention proceeds from a system for determining the gear ratio changes for an automatic transmission wherein, as mentioned, means are provided for determining the gear ratio changes by with of a characteristic field. The following are supplied to the characteristic field: the detected position of the accelerator pedal actuated by the driver of the vehicle as the first input variable or the variables associated therewith and, as a second input variable, the detected vehicle straight-line speed (that is, the speed in the forward direction of movement) and/or the transmission output rpm and/or the engine rpm or variables associated herewith. Furthermore, it is known to determine the gear ratio changes in dependence upon an adaptation variable (BZ). In addition, it is known to determine the adaptation variable utilizing an evaluation mode which considers at least the time-dependent derivative of the first input variable.

The essence of the invention is that the determination of the adaptation variable by means of the evaluation mode is dependent upon a comparison of the time-dependent change of the first input variable to at least a threshold value. The evaluation mode considers at least the time-dependent derivative of the first input variable. This determination of the adaptation variable affords the advantage that this evaluation mode, which is generally configured to be complex, is only then utilized when the first input variable (the detected position of the accelerator pedal actuated by the driver of the vehicle or variables associated therewith) makes this appear as necessary.

The first input variable represents the movement of the accelerator pedal actuated by the driver. The background of the invention is that especially this first input variable permits a first estimate of the driving style of the driver. According to the invention, the relatively complex evaluation mode (which considers at least the time-dependent derivative of the first input variable) is only then run through when the time-dependent changes of the actuations of the accelerator pedal signalize a type of driver orientated to engine power. Otherwise, a more consumption-orientated characteristic line selection is used as the basic setting. For this purpose, it can be provided that this evaluation mode is only then used when the time-dependent change of the first input variable at least exceeds a first threshold value.

In a further embodiment of the invention, the adaptation variable is dependent upon a comparison of the second input variable (variables associated with vehicle straight-line speed) to a second threshold value by means of the above-described evaluation mode. It can be especially provided that this evaluation mode is only then used when the second input variable exceeds the second threshold value. This embodiment of the invention also has the advantage that the complex evaluation mode is only then used when the situation appears to make it necessary. For this purpose, the second input variable, which directly or indirectly represents the vehicle straight-line speed, is compared to a threshold value. If the vehicle moves at lower speed, then the complex evaluation mode is not necessary. Only at higher vehicle speeds and additional powerful accelerator pedal movements, is the complex evaluation mode used to determine driving performance.

In still another advantageous embodiment of the invention, a further evaluation mode is used which is referred to in the following as the second evaluation mode and is in addition to the above-mentioned evaluation mode which is now referred to as the first evaluation mode. Whereas, in the first evaluation mode, the time-dependent change of the first input variable (accelerator pedal actuation) was considered; in the second evaluation mode, the first and second input variables are considered directly (without time-dependent derivative). According to the invention, this second evaluation mode can then be used when the time-dependent change of the first input variable drops below at least the first threshold value. Accordingly, in this embodiment of the invention, the second evaluation mode is run through when the accelerator pedal movements cause it to appear that the complex first evaluation mode is not necessary.

In still another advantageous embodiment of the invention, and in addition to the first evaluation mode (and, in one embodiment, additional to the second evaluation mode) a further evaluation mode is provided and this further evaluation mode considers exclusively the first input variable (accelerator pedal movement) to determine the adaptation variable. This further evaluation mode is, according to the invention, only then used when the second input variable (that is, the vehicle speed) lies below a threshold value. This embodiment affords the advantage that the further evaluation mode (which is based only on the accelerator pedal position) can be simply realized with respect to complexity. If relatively low vehicle speeds are present, then such a simple evaluation mode is generally satisfactory.

In a special advantageous embodiment of the invention, the above-described three evaluation modes are provided. The first and relatively complexly configured evaluation mode, which considers the time-dependent change of the accelerator pedal actuation, is only then utilized when the vehicle has exceeded a specific straight-line speed and the time-dependent change of the accelerator pedal position exceeds a specific threshold value. If the vehicle straight-line speed is greater than a specific threshold value (without the time-dependent change of the accelerator pedal position exceeding the corresponding threshold value), then the second evaluation mode of lesser complexity is selected. This second evaluation mode considers the accelerator pedal position and the vehicle speed. Only when the vehicle straight-line speed drops below a certain threshold, is the accelerator pedal position evaluated in a third simple evaluation mode. A system of this kind provides an optimal adaptation of the shifting operation to the driving performance of the driver without requiring a great amount of computer capacity.

In a further advantageous embodiment of the invention, the determination the adaptation variable is then made by means of the first evaluation mode when the time-dependent change of the first input variable (accelerator pedal movement) exceeds at least a first threshold value in at least two time-sequenced successive comparisons. Likewise, the time-sequenced successive comparisons can consider different threshold values. This embodiment of the invention supplies still further differentiated criteria as to when the first complex evaluation mode is to be utilized.

The determination of the gear ratio changes is dependent upon the adaptation variable and can take place in that different characteristic fields can be selected in dependence upon the adaptation variable. In the simplest case, a characteristic line field can be provided which optimizes the shifting operations with respect to the consumption and another which optimizes with respect to engine power. As an alternative to several characteristic line fields, a single basic shifting characteristic field can be provided which is displaced by the adaptation variable or whose input variables are changed which, de facto, leads to a displacement of the characteristic field.

The automatic transmission can have several discrete adjustable transmission gear ratios or can be continuously adjustable in its gear ratio.

BRIEF DESCRIPTION OF THE DRAWINGS

The invention will now be described with reference to the drawings wherein:

FIG. 1a is a schematic block circuit diagram of the system according to the invention;

FIG. 2 is a graph showing the first evaluation mode;

FIG. 3 is a schematic block diagram showing a second evaluation mode;

FIG. 4 shows the membership function corresponding to the second evaluation mode of FIG. 3;

FIG. 5 shows the fuzzy rules corresponding to the second evaluation mode of FIG. 3;

FIG. 6 is a block diagram showing a third evaluation mode;

FIG. 7 shows the membership function corresponding to the third evaluation mode of FIG. 6; and, FIG. 8 shows the fuzzy rules corresponding to the third evaluation mode of FIG. 6.

DESCRIPTION OF THE PREFERRED EMBODIMENTS OF THE INVENTION

Figure 1B:
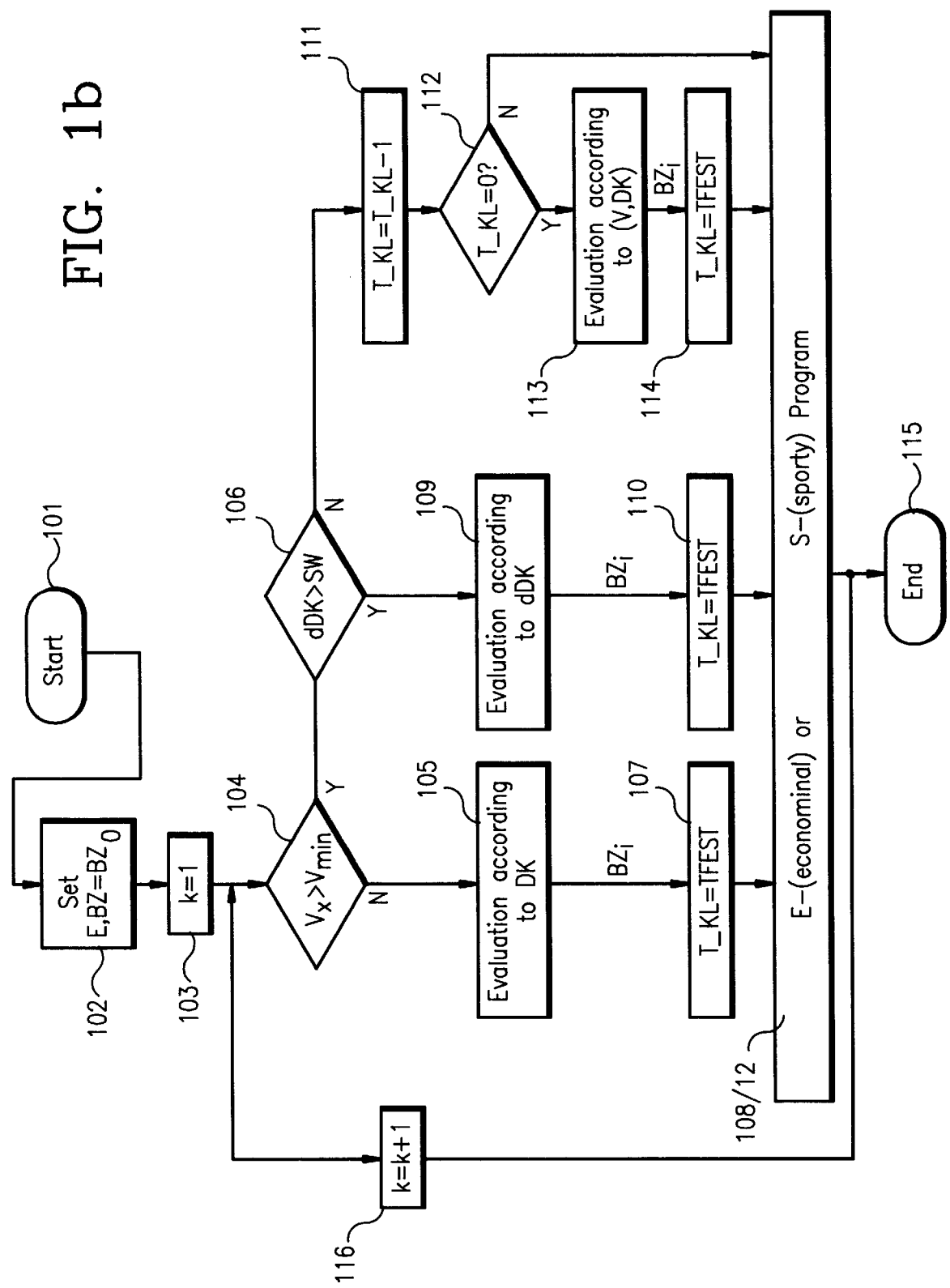
FIG. 1b is a flow-chart showing a sequence of operations according to a simple embodiment of the invention.

In FIG. 1a, block 10 represents sensors which detect the first and second input variables of each of the units 11 and 12. The position DK of the throttle flap or accelerator pedal and the vehicle straight-line speed $V_x$ are shown applied to both units. These input variables are supplied to a block 12 from which desired gear ratios SG are transmitted to the automatic transmission 13. The desired gear ratios SG are obtained from the throttle flap position and the vehicle straight-line speed by means of a characteristic field in block 12. The adaptation variable BZ is an output variable of the block 11 and is supplied to block 12 as an input variable. As will be described below, the response characteristic of block 12 changes, that is, the correspondence of the desired gear ratios SG to the input variables of throttle flap position DK and vehicle straight-line speed $V_x$.

If the automatic transmission 13 is a stepped transmission, then generally, different characteristic lines for initiating upshifting or downshifting operations are provided in the block 12. If the automatic transmission 13 is a continuously variable transmission, then a characteristic field is stored in block 12. Various different characteristic lines or characteristic fields are selected via the adaptation variable BZ. Likewise, as mentioned, a basic shifting characteristic field or basic shifting characteristic line is displaced. This can take place, for example, in that the input variables of the block 12 are manipulated. The formation of the adaptation variable BZ in block 11 is described in greater detail with respect to FIGS. 1b and 1c.

Figure 1C:
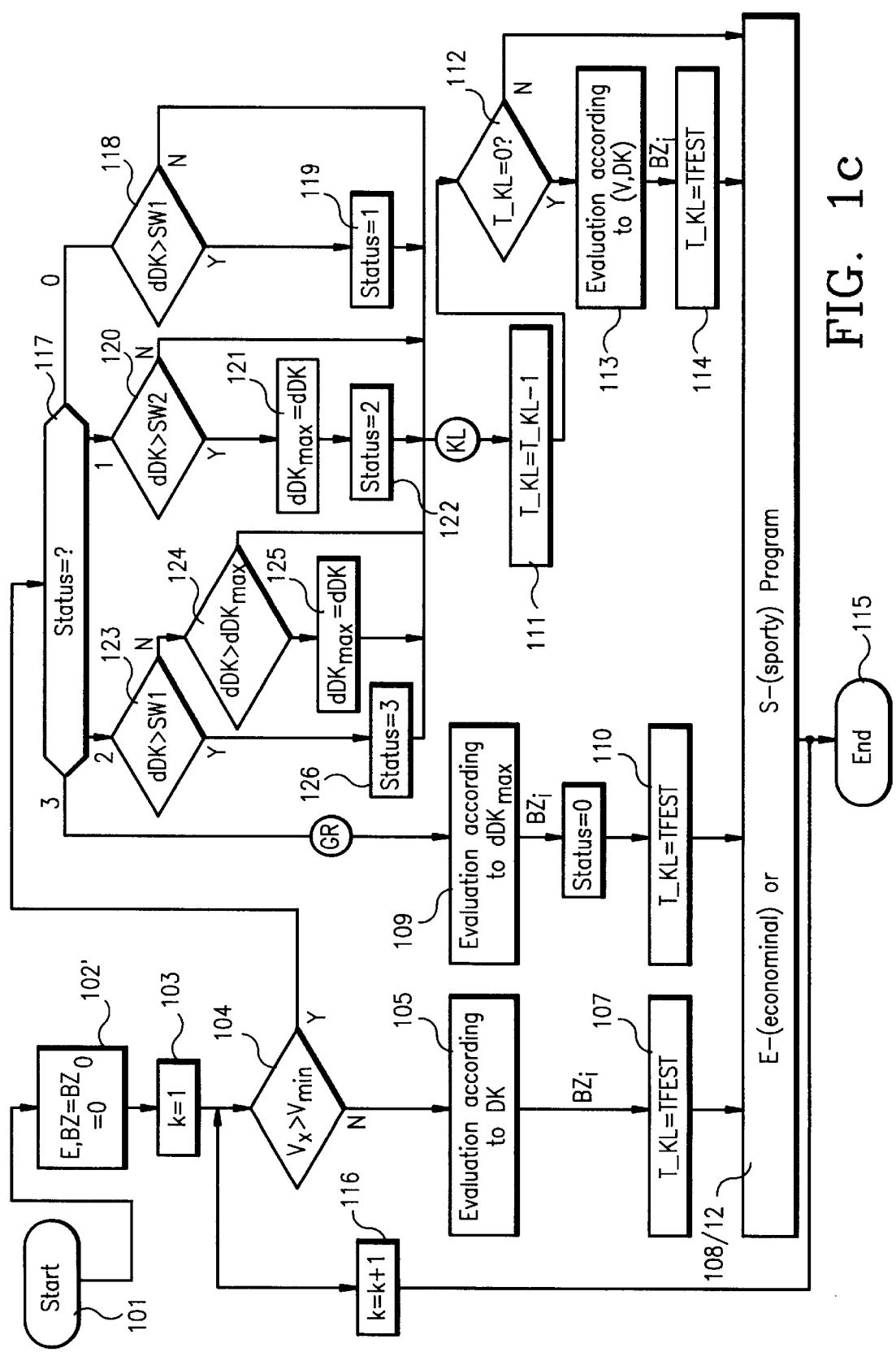
FIG. 1c is a flow-chart showing the sequence of operations according to another more complex embodiment of the invention.

Sequence diagrams are shown in FIGS. 1b and 1c. FIG. 1b is a simple embodiment and FIG. 1c is a somewhat more complex embodiment. FIGS. 1b and 1c, blocks having the same significance or function are identified by the same reference numerals.

Referring now to FIG. 1b, after the start 101, a fixed value $BZ_0$ is set as the start value for the adaptation variable BZ in step 102. This corresponds to a consumption-optimized gear ratio program. In step 103, the counter k =1 is set whereafter, in step 104, the vehicle straight-line speed $V_x$, which is detected in block 10 (FIG. 1a), is compared to a threshold value $V_{min}$ (for example, in the region of 30 km/h). If the detected vehicle straight-line speed $V_x$ lies below the threshold value $V_{min}$ in step 104, then in step 105, one of the three evaluation modes 105, 109 and 113 is carried out. In accordance with the descriptions of FIGS. 1b and 1c, the evaluation modes will be described infra with respect to FIGS. 2 to 8. At this point, the evaluation mode 105 will now be treated only to the extent that here a relatively simple evaluation takes place while considering only the throttle flap angle DK. The actually determined adaptation variable $BZ_i$ is present at the output end of the evaluation mode 105. After running through the evaluation mode 105, a counter $T_{13}$ KL is set to the value TFEST (step 107).

In step 108, the response characteristic of block 12 is changed or is left unchanged depending upon the result of the evaluation 105. Thereafter, a counter k is set to k +1 (step 116) whereafter, in step 104, the detected vehicle straight-line speed $V_x$ is again compared to the corresponding threshold $V_{min}$. If the vehicle straight-line speed $V_x$ exceeds the threshold value $V_{min}$, then, in step 106, the time-dependent derivative dDK of the throttle flap angle (that is, the time change of the throttle flap angle) is compared to a threshold value as SW. If the time-dependent derivative dDK of the throttle flap angle is below the threshold value SW, then, in step 111, the counter value $T_{13}$ KL is decremented by 1 ($T_{13}$ KL–1 ).

In step 112, an inquiry is made as to the counter position of the counter T_KL. If this counter has still not decremented to the value 0, then the characteristic of block 12 (step 108) remains unchanged. If the counter position T_KL has the value 0, then this means that, for a number of program run throughs (determined by the value TFEST), the vehicle straight-line speed $V_X$ has been above the corresponding threshold $V_{min}$, on the one hand, and, the time-dependent derivative dDK of the throttle flap angle has been below the corresponding threshold SW, on the other hand. Accordingly, in step 113, an evaluation on the basis of vehicle straight-line speed and the actual throttle flap angle is initiated. The evaluation 113 will also be explained later with respect to FIGS. 2 to 8. At the output end, the actually determined reference variable $BZ_i$ is present which, in step 108, leads to a change of the response characteristic of the block 12 as may be required. The counter value T_KL is set to a value TFEST after the evaluation 113 has been run through.

If, for a new run through of the program cycle, the vehicle straight-line speed $V_X$ is above the corresponding threshold $V_{min}$ and the time-dependent change dDK of the throttle flap angle is likewise above the threshold value SW, then in step 109, an evaluation on the basis of the time-dependent change dDK of the throttle flap angle is initiated. This evaluation 109 too will be described with respect to FIGS. 2 to 8. As a result of this evaluation in step 109, the response characteristic of block 12 is changed, as may be required, because of the actually determined adaptation variable $BZ_i$ in step 108. Likewise, the count value T_KL is fixed to the value TFEST in step 110.

In summary, it is noted with respect to the structure shown in FIG. 1b, that a differentiation is made between three evaluation modes (105, 109 and 113) on the basis of two threshold value comparisons (steps 104 and 106).

At this point, it is to be noted with respect to the evaluation modes to be described in greater detail infra, that: the evaluation for evaluation mode 109 is relatively complex, the evaluation for evaluation mode 113 is less complex, and the evaluation for evaluation mode 105 is relatively simple. The relatively simple evaluation mode 105 is carried out at relatively low vehicle speeds (the threshold $V_{min}$ can, for example, be at 30 km/h). If however, a higher vehicle speed is present (for example, over 30 km/h) and the time-dependent change dDK of the throttle flap angle is, however, not adequately large (step 106), then the evaluation mode 113 of lesser complexity is carried out.

The relatively complex evaluation step 109 is carried out only for adequately high vehicle straight-line speeds and adequately high changes of the throttle flap angle are present. The evaluation 113 is carried out after a certain number of program run throughs after the vehicle speed $V_x$ has exceeded the threshold value Vmin (step 104) and the throttle flap angular change dDK has dropped below the threshold SW (step 106). This number of program run throughs is determined by the selection of the counter value TFEST (steps 107, 110 and 114).

A further embodiment of the invention is shown in FIG. 1c. For the sake of brevity, only the steps or blocks are described by means of which the program sequence shown in FIG. 1c is different from that shown in FIG. 1b.

After the start step 101, a signal status equal to 0 is set in addition to a start value $BZ_o$ for the adaptation variable in a step 102'. If the vehicle speed $V_x$ exceeds the already-described threshold value $V_{min}$ after the vehicle has started, then, in step 117, the instantaneously set status value is interrogated. If, after start of the vehicle, the vehicle speed $V_x$ exceeds the corresponding threshold $V_{min}$ for the first time, then the status value set in step 102 ' has the value 0.

In the step 118 which then follows, the time-dependent change dDK is compared to a compared to a first threshold value SW1. If the time-dependent change dDK exceeds the first threshold value SW1, then the evaluation 113 is carried out in accordance with steps 111 and 112 described above when the counter value T_kl reaches 0. If it is determined in step 118 that the time-dependent change dDK of the throttle flap angle is below the first threshold SW1, then the value 1 is set as the status in step 119. After the above-described steps 111 and 112 and, if required, steps 113 and 114 or 108, the inquiry 120 is made in the next program cycle in step 117 as a reaction to the status value 1 set in step 119. If it is determined in step 120 that the time-dependent change dDK is less than a second threshold value SW2, then, in turn, the above-described steps (111, 112) and, if required, steps (113, 114 and 108) are carried out. However, if it is determined in step 120 that the time-dependent change dDK is greater than the second threshold value SW2, then, in step 121, the actually determined time-dependent change dDK of the throttle flap angle is set as a maximum value $dDK_{max}$. This maximum value $dDK_{max}$ is needed in the evaluation 109 described later and in the comparison 124.

After the status is set to the value 2 in step 122 and after the steps described above have already been run through and starting with step 111, the program moves toward the interrogation 123 in the next program cycle after step 117. Here, the time-dependent change dDK of the throttle flap angle is, again, compared to the first threshold value SW1. If it is determined in step 123 that the time-dependent change dDK of the throttle flap angle is greater than the first threshold value SW1, then, in step 124, the instantaneous change of the throttle flap angle is compared to the maximum value $dDK_{max}$ set in step 121. The steps already described are carried out with the step 111 if the actually determined time-dependent change of the throttle flap angle is less than the last set maximum value. If the actually determined time-dependent change dDK of the throttle flap angle is greater than the maximum value $dDK_{max}$ determined last in step 121, then the current determined change of the throttle flap angle is set as the new maximum value in step 124.

Thereafter, the steps already described are carried out with step 111. If it is determined in step 123 that the time-dependent change dDK of the throttle flap angle is less than the first threshold value SW1, then the status is set to the value 3 in step 126. After the steps already described have been run through and starting with step 111, the evaluation 109 is carried out after the status inquiry 117. The status is again set to 0 after the evaluation 109 which will be described infra.

In summary as to the embodiment of FIG. 1c, it is noted that the simple threshold value interrogation 106 of FIG. 1b is replaced by a algorithm of greater complexity.

In the following, the sequence shown in FIG. 1c is explained again. For $V > V_{min}$, the evaluation of the type of driver takes place in dependence upon the value STATUS either according to the change dDK of the throttle flap angle or in accordance with the speed $V_X$ and the throttle flap angle DK.

| | |
|---|---|
| For STATUS = 0 and dDK < SW1 | STATUS = 1 is set, then a branch to mark KL. |
| For STATUS = 0 and dDK ≧ SW1 | branch to mark KL. |
| For STATUS = 1 and dDK > SW2 | if $dDK_{max}$ = dDK and STATUS = 2 are set, then branch to mark KL. |
| For STATUS = 1 and dDK ≦ SW2 | branch to mark KL. |
| For STATUS = 2 and dDK < SW1 | if STATUS = 3 is set, then branch to mark KL. |
| For STATUS = 2 and dDK ≧ SW1 and dDK > $dDK_{max}$ | if $dDK_{max}$ = dDK is set, branch to mark KL. |
| For STATUS = 2 and dDK ≧ SW1 and dDK ≦ $dDK_{max}$ | branch to mark KL. |
| For STATUS = 3 | branch to mark GR. |

Reaching the mark KL means that:

T–KL is decremented by 1

When T–KL =0, then evaluation in accordance with speed $V_X$ and the throttle flap angle DK, thereafter, the counter T_KL is set anew.

When T–KL ≠0, then no evaluation.

Reaching the mark GR means: evaluation in accordance with the change of the throttle flap angle dDK, and thereafter, STATUS =0 and the counter T_KL are set anew.

It should be here noted that the first threshold value SW1 is selected to be less than the second threshold value SW2.

With the embodiment shown in FIG. 1c, a still further differentiated statement is obtained as to which of the two evaluation modes 109 and 113 is more purposeful to carry out.

In the following, an embodiment is described wherein the block 12 has two different response characteristics which correspond to a consumption-optimized shifting program and to a motor power-orientated shifting program. It is here, however emphasized, that a transition between more than two shifting programs up to a continuous change of response characteristic of the block 12 can be made without departing from the concept of the invention.

Referring to FIG. 2, the relatively simply-configured evaluation mode 105 is now described in greater detail. Here, the actually detected throttle flap angle DK is used directly as the adaptation variable $BZ_i$, namely:

$$BZ_i=DK$$

The evaluation mode 105 comprises that the actually detected throttle flap angle DK is compared to two threshold values DK1 and DK2 and, in dependence upon these threshold value comparisons, three different times 0, $t_{sport1}$ and $t_{sport2}$ are selected; that is, the consumption-optimized shifting program set in steps 102 or 102' is retained when the throttle flap angle DK is below the first threshold value DK1. If the actually adjusted throttle flap angle is above the first threshold value DK1 and below the second threshold value DK2, then a switch-over is made to a motor power-orientated program S for a specific time $t_{sport2}$. If the actually detected throttle flap angle DK exceeds the second threshold value DK2, then a switchover is made to the motor power-orientated shifting program for a fixed time $t_{sport2}$. Here, the time $t_{sport2}$ is greater than the time $t_{sport1}$. From FIG. 2, it can be seen that the evaluation mode 105 defines a relatively simple evaluation, namely, an evaluation requiring little computer capacity.

The evaluation 113 shown in FIGS. 3 to 5 is more complex than the evaluation mode 105. For this purpose, the straight-line speed $V_x$ detected by sensors 10 and the throttle flap angle DK are supplied to the fuzzy module 31 shown in FIG. 3. In the fuzzy model 31, the input variables $V_x$ and DK are logically combined to form the output signal ERG1 by means of the membership function in FIG. 4 and the fuzzy rules shown in FIG. 5. The last-determined adaptation variable $BZ_{i-1}$ is subtracted from this output signal ERG1 in the logic element 32. This difference is multiplied by a selectable factor in unit 33 and, in logic element 34, the last-determined adaptation variable $BZ_{i-1}$ is superposed additively thereon to form adaptation variable $BZ_i$.

FIG. 3 is a schematic of evaluation 113, wherein the variable $ERG_1$ is computed with the aide of a fuzzy module from the vehicle straight-line speed $V_x$ and the throttle flap angle DK. The variable ERG1 is filtered in a filter 35 to form the actual adaptation variable $BZ_i$ as follows:

$$BZ_i=BZ_{i-1}+(ERG1-BZ_{i-1}) * Factor$$

The factor (block 33) is a selectable application parameter and is in general selected to be less than one.

The evaluation 109 will now be described with reference to FIGS. 6, 7 and 8. On the one hand, the adaptation variable $BZ_{i-1}$, which was determined in the previous computation cycle, and the actual derivative dDK of the throttle flap angle (in the embodiment of FIG. 1b) or the maximum value $dDK_{max}$ (in the embodiment of FIG. 1c) are supplied to the fuzzy module 61 shown in FIG. 6. The input signals of the fuzzy module 61 are logically combined to form the output signal ERG2 based on the membership function shown in FIG. 7 and the fuzzy rules shown in FIG. 8. This output signal is logically combined additively with the last-determined adaptation variable $BZ_i-1$ in logic element 62 to form the instantaneous adaptation variable $BZ_i$.

As a result of the evaluations 113 or 109, an updated adaptation variable $BZ_i$ is obtained which decides whether the vehicle is driven with a more consumption-optimized shifting program or a more power-orientated shifting program.

$BZ_i<BZ_{min}$: E-Program $BZ_i≦BZ_{min}$: E-Program

It is noted once more that the two stage adjustable shifting response is only one embodiment. An expansion to several shifting programs or to continuously adjustable characteristic lines or characteristic fields can be easily made without departing from the concept of the invention.

It is understood that the foregoing description is that of the preferred embodiments of the invention and that various changes and modifications may be made thereto without departing from the spirit and scope of the invention as defined in the appended claims.

What is claimed is:

1. A system for determining the gear ratio changes in an automatic transmission in a vehicle having an accelerator pedal actuated by a driver of the vehicle whereby the position of said accelerator pedal changes as a function of time, the system comprising:

first sensor means for detecting the position (DK) of said accelerator pedal as a first variable;

second sensor means for detecting at least one of the following as a second variable: the vehicle straight-line speed ($V_x$), transmission output rpm and the motor rpm;

adaptation variable means for determining a changing position (dDK) in dependence upon said first variable and for determining an adaptation variable (BZ) in an evaluation mode in dependence upon said changing position (dDK) and for comparing said changing position (dDK) to at least one threshold value (SW, SW1, SW2) so that the determination of said adaptation variable (BZ) is made only when said at least one threshold value (SW, SW1, SW2) is exceeded;

gear ratio change means including a characteristic field for receiving said first and second variables as input variables;

said gear ratio change means being adapted to utilize said characteristic field and said adaptation variable (BZ) to form a gear ratio change (SG) for said automatic transmission; and, said gear ratio change taking place in such a manner that, in dependence upon said adaptation variable (BZ):
either different characteristic line fields (E, S) are selected; or,
a basic characteristic field is changed by displacement or by changing said first variable and/or said second variable.

2. The system of claim 1, wherein said adaptation variable means is so configured that the determination of said adaptation variable (BZ) via said evaluation mode is furthermore dependent upon a comparison of said second variable to a second threshold value ($V_{min}$).

3. The system of claim 2, wherein the determination of said adaptation variable (BZ) is made by means of said first evaluation mode when said second variable exceeds a second threshold value ($V_{min}$).

4. The system of claim 1, wherein said evaluation mode is a first evaluation mode and said adaptation variable means further including a second evaluation mode for considering at least said first and second variables; and, wherein said determination of said adaptation variable (BZ) is made by means of said second evaluation mode when the time-dependent change of said first variable drops below at least said first threshold value (SW).

5. The system of claim 4, wherein said adaptation variable means further including a third evaluation mode wherein only said first variable is considered; and, wherein said determination of said adaptation variable (BZ) is made when said second variable drops below the second threshold value ($V_{min}$).

6. The system of claim 1, wherein the determination of the adaptation variable (BZ) via said first evaluation mode is then made when the time-dependent change of said first variable exceeds at least a first threshold value (SW, SW1, SW2) in at least two time-sequenced successive comparisons.

7. The system of claim 6, wherein the determination of said adaptation variable (BZ) via said first evaluation mode is then made when the time-dependent change of said first variable exceeds at least two different threshold values (SW1, SW2) in at least two time-sequenced successive comparisons.

8. The system of claim 1, wherein said automatic transmission includes several discretely adjustable gear ratio changes or gear ratio changes which are continuously adjustable.

9. The system of claim 1, wherein said changing position (dDK) is the time-dependent derivative (dDK) of said first variable.

10. A system for determining the gear ratio changes in an automatic transmission in a vehicle having an accelerator pedal actuated by a driver of the vehicle whereby the position of said accelerator pedal changes as a function of time, the system comprising:

first sensor means for detecting the position (DK) of said accelerator pedal as a first variable;

second sensor means for detecting at least one of the following as a second variable: the vehicle straight-line speed ($V_x$), transmission output rpm and the motor rpm;

adaptation variable means for determining a changing position (dDK) in dependence upon said first variable and for determining an adaptation variable (BZ) in an evaluation mode in dependence upon said changing position (dDK) and for comparing said changing position (dDK) to at least one threshold value (SW, SW1, SW2) so that the determination of said adaptation variable (BZ) is made only when said at least one threshold value (SW, SW1, SW2) is exceeded;

gear ratio change means including a characteristic field for receiving said first and second variables as input variables;

said gear ratio change means being adapted to utilize said characteristic field and said adaptation variable (BZ) to form a gear ratio change (SG) for said automatic transmission;

the formation of said adaptation variable (BZ) being made by utilizing said evaluation mode only when said time-dependent change of said first variable exceeds at least one threshold value (SW, SW1, SW2); and, said gear ratio change taking place in such a manner that, in dependence upon said adaptation variable (BZ):
either different characteristic line fields (E, S) are selected; or,
a basic characteristic field is changed by displacement or by changing said first variable and/or said second variable.

* * * * *

UNITED STATES PATENT AND TRADEMARK OFFICE
CERTIFICATE OF CORRECTION

PATENT NO. : 5,954,777
DATED : September 21, 1999
INVENTOR(S) : Chi-Thuan Cao, Klemens Kronenberg and Marko Poljansek It is certified that error appears in the above-identified patent and that said Letters Patent is hereby corrected as shown below:

Column 4,
Line 64, delete "$T_{13}KL$" and substitute -- $T\_KL$ -- therefor.

Column 5,
Line 9, delete "$T_{13}KL$" and substitute -- $T\_KL$ -- therefor;
Line 10, delete "$(T_{13}KL-1)$." and substitute -- $(T\_KL-1)$ therefor;
Line 13, between "the" and "characteristic", insert -- response --;
Lines 17 and 31, delete "$V_X$" and substitute -- $V_x$ -- therefor;
Line 63, delete "Vmin" and substitute -- $V_{min}$ --therefor.

Column 7,
Line 3, delete "$V_X$" and substitute -- $V_x$ -- therefor;
Line 58, delete "$t_{sport2}$" and substitute -- $t_{sport1}$ -- therefor.

Column 8,
Line 13, delete "$ERG_1$" and substitute -- ERG1 -- therefor;
Line 33, delete "$BZ_i-1$" and substitute -- $Bz_{i-1}$ -- therefor;
Line 41, delete "$BZ_i \leq BZ_{min}$:E-Program" and substitute -- $BZ_i \geq BZ_{min}$:E-Program -- therefor.

Signed and Sealed this

Seventh Day of August, 2001

*Attest:*

*Attesting Officer*

NICHOLAS P. GODICI
*Acting Director of the United States Patent and Trademark Office*